US012806856B2

(12) United States Patent
Baumann et al.

(10) Patent No.: US 12,806,856 B2
(45) Date of Patent: Nov. 24, 2026

(54) DEVICE AND METHOD FOR ADDITIVE COMPONENT MANUFACTURE

(71) Applicant: SIMONA AG, Kirn (DE)

(72) Inventors: Edwin Baumann, Ettenheimweiler (DE); Matthias Behr, Ringsheim (DE); Michael Gross, Birkenfeld (DE); Anne Burkhart, Mainz (DE)

(73) Assignee: SIMONA AG, Kirn (DE)

( * ) Notice: Subject to any disclaimer, the term of this patent is extended or adjusted under 35 U.S.C. 154(b) by 272 days.

(21) Appl. No.: 18/373,585

(22) Filed: Sep. 27, 2023

(65) Prior Publication Data

US 2024/0109248 A1 Apr. 4, 2024

(30) Foreign Application Priority Data

Oct. 4, 2022 (DE) ..................... 10 2022 125 491.7

(51) Int. Cl.
*B29C 64/209* (2017.01)
*B29C 64/118* (2017.01)
(Continued)

(52) U.S. Cl.
CPC .......... *B29C 64/209* (2017.08); *B29C 64/118* (2017.08); *B29C 64/241* (2017.08);
(Continued)

(58) Field of Classification Search
None
See application file for complete search history.

(56) References Cited

U.S. PATENT DOCUMENTS 11,110,655 B2 9/2021 Budge et al.
2006/0048881 A1* 3/2006 Evans ..................... B29C 66/45
156/64
(Continued)

FOREIGN PATENT DOCUMENTS

CN 113752547 A 12/2021
DE 102016200522 A1 7/2017
(Continued)

OTHER PUBLICATIONS

Collins, "What are fixed and floating bearing in the context of linear motion?" <https://www.linearmotiontips.com/what-are-fixed-and-floating-bearings-in-the-context-of-linear-motion/> (Year: 2020).*
(Continued)

*Primary Examiner* — Armand Melendez
(74) *Attorney, Agent, or Firm* — Quarles & Brady LLP

(57) ABSTRACT

The invention relates to a device (01) for additively manufacturing an, in particular rotationally symmetric, component (02), said device (01) having a material application unit (03) which is movable along at least two axes and which has an extruder (04) and a nozzle (05) for applying a material strand (06), a rotary head (07) having a compressor (08) for compressing a material strand (06) and having a heating device (09) for heating at least one material application area (10) being disposed on the material application unit (03), the rotary head (07) being rotatable around the nozzle (05), and a control device (11) being comprised which is configured to control at least the rotary head (07) and the compressor (08) and the heating device (09). Furthermore, the invention relates to a method for additively manufacturing an, in particular rotationally symmetric, component (02), at least one material strand (06) for manufacturing the component (02) being applied in layers by means of a material appli-
(Continued)

cation unit (03), and to a component (02) manufactured using this method.

10 Claims, 6 Drawing Sheets

(51) Int. Cl.

| | |
|---|---|
| ***B29C 64/241*** | (2017.01) |
| ***B29C 64/245*** | (2017.01) |
| ***B29C 64/25*** | (2017.01) |
| ***B29C 64/295*** | (2017.01) |
| ***B29C 64/393*** | (2017.01) |
| ***B33Y 10/00*** | (2015.01) |
| ***B33Y 30/00*** | (2015.01) |
| ***B33Y 50/02*** | (2015.01) |
| ***B33Y 80/00*** | (2015.01) |

(52) U.S. Cl.
CPC ............ *B29C 64/245* (2017.08); *B29C 64/25* (2017.08); *B29C 64/295* (2017.08); *B29C 64/393* (2017.08); *B33Y 10/00* (2014.12); *B33Y 30/00* (2014.12); *B33Y 50/02* (2014.12); *B33Y 80/00* (2014.12)

(56) References Cited

U.S. PATENT DOCUMENTS

| | | | | |
|---|---|---|---|---|
| 2015/0266243 | A1* | 9/2015 | Mark .................... | B29C 64/106 425/143 |
| 2020/0368970 | A1 | 11/2020 | Georgeson et al. | |
| 2022/0078955 | A1* | 3/2022 | Burgess ................ | B25B 11/002 |
| 2024/0131784 | A1* | 4/2024 | Torres Martinez ... | B29C 48/302 |

FOREIGN PATENT DOCUMENTS

| | | | | |
|---|---|---|---|---|
| DE | 102017008130 | A1 | 2/2019 | |
| EP | 3345742 | A1 | 7/2018 | |
| EP | 3584062 | A1 | 12/2019 | |
| EP | 3740373 | B1 | 6/2022 | |
| WO | 2017150186 | A1 | 9/2017 | |
| WO | 2019160616 | A1 | 8/2019 | |
| WO | WO-2022180290 | A1 * | 9/2022 | ........... B29C 64/209 |

OTHER PUBLICATIONS

European Patent Office, Search Report, Application No. 23200295, filed Feb. 14, 2024, 2 pages.

* cited by examiner

DEVICE AND METHOD FOR ADDITIVE COMPONENT MANUFACTURE

CROSS REFERENCE TO RELATED APPLICATIONS

This application claims priority of German Patent Application No. 10 2022 125 491.7 filed on Oct. 4, 2022, the content of which is hereby incorporated by reference in its entirety.

The invention relates to a device for additively manufacturing an, in particular rotationally symmetric, component, according to the preamble of claim 1. Furthermore, the present invention relates to a method for additively manufacturing an, in particular rotationally symmetric, component. In addition, the invention relates to a component manufactured by means of such a method.

Devices for additively manufacturing a component are known in the art, with additive manufacturing also being referred to as additive fabrication, 3D printing or generative manufacturing. Known devices typically comprise a material application unit configured as a printing head and a print table on which a printing plate may be disposed. A component is additively manufactured by configuring the printing head to apply a printing material to selected areas of the printing plate. In order to achieve a shape corresponding to the component to be produced, the printing head and the printing plate or the print table must be able to move relative to each other. Typically, this relative movement to each other is achieved by connecting the print table and/or the printing head with linearly moving means that are linearly movable along correspondingly disposed linear guides. It is known that the printing head can move in a plane defined by a first and a second linear guide. The print table is attached to a third linear guide and can move along it perpendicular to the plane in which the printing head can be moved. In the layered build-up of the component, at least one material strand is applied to produce a layer of the component while the printing head is moving in a plane, usually in the x-y plane. Once a layer has been completed, the printing head is usually moved vertically upwards, i.e., in the z-direction, or the print table is moved vertically downwards, and the strand-by-strand application of material is started in a further layer, so that the component is built up layer by layer in the z-direction.

Particularly with relatively large components or relatively large build volumes of the additive manufacturing systems, the connection of the material strands deposited by means of the material application unit may be insufficient for certain requirements, as, for example, the requirements regarding stability, durability and/or pressure resistance cannot be met. Because of the layered build-up, generally in the z-direction, weak points arise in the generic additively manufactured components due to the inadequate bonding of the individual layers. This can be caused, for example, by the fact that the previous layer has already cooled down and therefore cannot form a bond with the subsequent layer. However, such insufficient dimensional and compressive stability is disadvantageous in particular when manufacturing and using rotationally symmetrical components, such as tubes or tube sections.

In view of the foregoing background, the object of the present invention is to propose a device and a method which overcome the disadvantages of the prior art and enable the production of dimensionally stable and pressure-resistant, in particular rotationally symmetrical, components by means of additive manufacturing.

This object is attained by a device for additively manufacturing an, in particular rotationally symmetric component, the device comprising a material application unit which is movable along at least two axes and has an extruder and a nozzle for applying a material strand.

According to the invention, the device is characterized by a rotary head disposed on the material application unit, the rotary head having a compressor for compressing a material strand and having a heating device for heating at least one material application area, the rotary head being rotatable around the nozzle, and a control device being comprised which is configured to control at least the rotary head, in particular the rotational movement of the rotary head, and the compressor, in particular the compressing of a material strand, and the heating device, in particular the thermal output of the heating device.

In the context of the invention, the term "additive manufacturing" refers to a possibility of manufacturing by applying material, preferably plastic material, layer by layer in an additive manufacturing device without further tools or molds. The layered build-up is carried out using a data set that contains the geometric data of the individual layers of the desired component and other parameters, such as processing temperature, layer height or resolution. The strength of such an additively manufactured component can depend in particular on the type of filling of the component, the so-called infill, as well as on the connection of the deposited material strands and layers to each other. Preferably, a component manufactured according to the invention is completely filled, i.e., in other words, the components are manufactured with an infill of 100%.

To further define the invention, it is assumed that the material application within a layer takes place in an x-y plane, and the layered build-up takes place in the z direction perpendicular to the x-y plane, so that the individual layers are disposed on top of each other in the z direction. However, the invention is neither limited to the aforementioned nomenclature nor to the use of a Cartesian coordinate system. Preferably, a continuous application of material, at least within one layer, is made possible by means of the material application unit of the device according to the invention, whereby an undesired tearing of the material strand within a layer of the component can be avoided.

The device according to the invention is based on the basic idea that after a material application in the form of a material strand, which is discharged from a nozzle, this discharged material strand can be compressed by means of the compressor. Pressure is applied to the material strand, in particular pressure from above, i.e., from the z-direction. By compressing the applied material strand, it is bonded to the adjacent material strands already applied in the x-y plane and also bonded to the layer or layers of the component below the layer currently being produced by applying pressure from above. Preferably, the compressor is designed to apply a defined and variable pressure to the deposited material strand. In other words, the pressure applied by the compressor can be adjusted and adapted to the requirements, such as material strand thickness, material or build volume temperature. In order to produce a sufficient bond, it has been found to be essential to the invention that the material strands or layers of the component to be joined must not yet have completely cooled and solidified. Therefore, in order to heat at least one material application area, a heating device is disposed on the rotary head according to the invention, which serves to heat the material application area on which a material strand is to be deposited immediately afterwards, so that a material bond, preferably a welded bond, can be made between the material disposed in the material application area and the material strand applied. Preferably, the heating device heats the material application area to the welding temperature of the processed material, the material used preferably being a thermoplastic material. In particular, the device according to the invention is suitable for additively manufacturing a component made of a semi-crystalline, preferably an unreinforced semi-crystalline, plastic.

Semi-crystalline plastics cannot usually be processed with generic additive manufacturing devices, as semi-crystalline plastics transition from being molten to the solid state within a narrow temperature range and have a higher processing shrinkage. The processing window is therefore smaller than for amorphous plastics, for example.

In the context of the invention, the term “layer currently being produced” or “current layer” refers to the layer in which a material strand is currently being applied by means of the material application unit and which has not yet been completed. On the other hand, in the context of the invention, the term “layer completed last” refers to the layer that was last applied in the build-up direction of the component immediately below the layer currently being produced.

In the context of the invention, the term “material application area” is understood to mean the area in which a material strand is deposited in order to produce the component. As already explained above, the material application unit, which has at least an extruder and a nozzle, can preferably be movable in the x-y plane and can deposit the layers necessary for the realization of a component by means of the nozzle, preferably on a printing plate, which can be lowered and/or raised in the z direction, or on the previously completed layers. In this way, after depositing a layer, the printing plate is lowered by one layer thickness so that the subsequent layer can be applied on top of the previous layer. In other words, the component is built up layer by layer and each layer is produced by the material application unit by following flat path curves and simultaneously depositing a material strand. In the context of the invention, the material application area refers to the area on the printing plate or on the layers of the component that have already been produced which will be traversed next by the material application unit. The size of the material application area can, for example, correspond to the radius or the diameter of the rotary head, and the width of several material strands can, for example, correspond to at least the width of two material strands. Thus, by heating the material application area, it is possible to heat an area of the component that has already been produced, in particular the last completed layer of the component, a material strand being intended to be deposited on the area of the component that has already been produced immediately afterwards, and to heat the material strands already deposited within the current layer and adjacent to the material strand to be deposited immediately afterwards.

According to the invention, the material application area can advantageously be heated first, then a material strand can be applied by means of the material application unit, in particular the nozzle, and subsequently this material strand can be compressed with the compressor for bonding with the neighboring material strands or the last completed layer of the component. For this purpose, the rotary head on the movable material application unit is preferably disposed in such a way that the compressor of the nozzle follows the nozzle in the direction of movement of the nozzle and the heating device or the material application area advances ahead of the nozzle in the direction of movement of the nozzle.

In order to ensure sufficient compression of the material strand and efficient heating of the material application area, the invention follows the basic idea of arranging the rotary head rotatably around the nozzle of the material application unit so that the compressor and the heating device can be aligned depending on the path curve to be followed by the material application unit. This is particularly important in the additive production of rotationally symmetrical or circular cylindrical components in order to be able to produce a material bond between the current layer and the last completed layer as well as within the individual layers between the material strands. Due to the material application unit having a rotary head according to the invention, both the compressor and the heating device can be swiveled by means of the rotary head in such a way that the material strand, which has just been deposited, can be compressed and the material application area, in which a material strand is to be applied immediately afterwards, can be heated in a simple manner depending on the travel path of the nozzle. It has been discovered in the context of the invention that compression and heating of the material application area and simultaneous material application is not possible with a rigid arrangement of the nozzle, compressor and heating device, in particular in the production of rotationally symmetrical or circular cylindrical components. Preferably, the rotary head rotates continuously around the nozzle, in particular during material application. It is also preferable for the rotary head to be driven continuously by means of a rotary drive. By heating the material using the heating device and compressing the deposited material strand using the compressor, fully loadable or pressure loadable components can be additively manufactured in an advantageous manner.

According to the invention, the control device comprised by the device for additively manufacturing an, in particular rotationally symmetric, component is configured to control at least the rotary head and the compressor and the heating device. It is also conceivable that the control device regulates the material application unit, in particular the material application based on the volume of material dispensed by the nozzle per unit of time. Controlling the rotary head, in particular the rotational movement of the rotary head, can be carried out in such a way that the control device rotates the rotary head relative to the nozzle and, depending on the travel path of the material application unit, in such a way that the compressor can come into contact, in particular centered, with the material strand that has just been deposited at any time. In this way, a controlled joining pressure can be advantageously applied. The rotation of the rotary head can also be controlled in such a way that the heating device is aligned at all times, in particular centered, on the material application area. For this purpose, the control device can be configured to process data relating at least to the travel path and/or the movement speed of the material application unit. For the required compression of a deposited material strand, it is intended that the control device regulates at least the contact pressure of the compressor, in other words, the application of pressure from above onto the material strand. For this purpose, the control device can be configured to process data relating to the material output volume from the nozzle and/or relating to the width and/or height of the deposited material strand. Furthermore, according to the invention, the control device can regulate the thermal output of the heating device in such a way that, depending on the material and movement speed, sufficient heating of the material application area can be ensured.

Advantageous embodiments of the invention are the subject of the dependent claims. In addition, all combinations of at least two features disclosed in the description, the claims and/or the figures fall within the scope of the invention. It is understood that all features and embodiments disclosed with respect to the device also relate in an equivalent, albeit not identical, manner to the method according to the invention. In particular, linguistically common rephrasing and/or an analogous replacement of respective terms within the scope of common linguistic practice, in particular the use of synonyms backed by the generally recognized linguistic literature, are of course comprised by the content of the disclosure at hand without every variation having to be expressly mentioned.

According to a preferred embodiment of the device, it can be intended that the compressor has a compressor roll which is rotatably mounted around a rotation axis. The rotation axis of the compressor roll preferably runs in an x-y plane and is preferably aligned transversely to the material strand by the rotatable rotary head. With a compressor roll of this type, an applied material strand can be compressed in a simple manner by simply moving the compressor roll along with the material application unit, provided that the compressor roll is appropriately positioned on the material strand, without causing damage to the component that has already been produced. It is also advantageous that the compressor does not require its own drive. Depending on the material strand to be applied, in particular its height, the nozzle outlet and compressor roll can be disposed relative to each other in such a way that neither a further drive for applying pressure in the z-direction nor a further drive for moving the compressor roll in the x-y-plane is required.

The temperature of the compressor can be controlled, i.e., cooled and/or heated. Preferably, the compressor is water-cooled and/or water-heated. More preferably, a compressor roll of the compressor can be tempered. The cooling of the compressor advantageously leads to the material strands, which have previously been heated and which are disposed next to each other or on top of each other, cooling down during the application of pressure by the compressor, preferably below their crystallization temperature, and thus, in combination with the application of pressure, a dimensionally stable, materially bonded connection can be produced. However, it is also conceivable that heating of the compressor is desired, in particular if, depending on the material, slow cooling of the material strand is required in order to avoid undesired shock-like solidification of the material strand.

It has proven to be advantageous that the heating device has a heating module for a contactless heating process, in particular an infrared heating module and/or a hot air module. Advantageously, an infrared heating module can be used to apply radiant heat to the material application area and thus to heat the component without contact, as the infrared heating module heats the objects located in the radiation area directly and does not heat the surrounding room air. The radiation area of the infrared heating module can also be easily adjusted and regulated using the control device so that only the required material application area is heated, if necessary. However, it is also conceivable that a hot air module could be used for heating. As the hot air module heats the room air in the build volume, the hot air module can also contribute to heating the build volume in addition to heating the material application area. The hot air output of the hot air module can be regulated using the control device so that the intensity and direction of the hot air output can be adjusted as required.

The device can comprise a temperature detecting element for detecting at least the temperature of a deposited material strand. Preferably, the temperature detecting element is disposed on the material application unit, more preferably on the rotary head, and is moved along with it accordingly, so that a temperature sensor of the temperature detecting element can be easily aligned with the area to be detected. More preferably, a temperature sensor of the temperature detecting element is designed as an infrared sensor, whereby it is conceivable that the temperature detecting element comprises a thermal imaging camera. In order to enable the control device to control the device for additively manufacturing an, in particular rotationally symmetric, component as comprehensively as possible, the control device is configured to process the temperature data recorded by the temperature detecting element and, depending on the temperature data, to control the material application unit, in particular the thermal output of the heating device, the material application of the material application unit, the temperature control of the material to be applied in the extruder, the application of pressure by the compressor and/or the temperature control of the compressor. In order to be able to record and control the additive production of the, in particular rotationally symmetric, component as precisely as possible and thus guarantee the required quality of the component, three temperature sensors are preferably dispsoed on the material application unit. A first temperature sensor is disposed in such a way that the temperature of the last completed layer can be recorded by means of this first temperature sensor and the material application area can be heated as required by means of the heating device on the basis of this data. The second temperature sensor can detect the temperature of the material application area after it has been heated and before the material strand is applied. The third temperature sensor can detect the temperature of the deposited material strand behind the compressor, i.e., after the material strand has been compressed. It is therefore possible to control the heating device using the data from the first and second temperature sensor and to control the temperature control and/or the pressure force of the compressor using the data from the third temperature sensor. More preferably, at least one temperature sensor, even more preferably all temperature sensors, of the temperature detecting element is/are designed as an infrared sensor, so that the temperature can be measured without contact using reflected radiation.

The device for additively manufacturing an, in particular rotationally symmetric, component can further comprise a distance detecting element for determining the distance between at least one material strand that has already been applied and a nozzle outlet of the nozzle. Since the position of the distance detecting element and the position of the nozzle outlet of the nozzle are known, the distance detecting element can be used to draw conclusions about the applied layer height to be measured in the z-direction by measuring the distance between the distance detecting element and the deposited material strand. On the one hand, if the distance detecting element is directed towards the last completed layer of the component, the layer height of this last completed layer can be determined. On the other hand, if the distance detecting element is directed towards the material strand deposited in the current layer, the layer height of the current layer can be determined. Preferably, the distance detecting element is directed towards the material application area and thus determines the layer thickness of the last completed layer of the component. Based on the distance measurement data, the material discharge and/or compression of the applied material strand can be controlled in such a way that a consistent layer height is guaranteed across all layers of the component. It has been discovered that the degree of expansion of the plastic material after exiting the nozzle and/or after application to the printing plate or component must be taken into account in order to determine a height compensation that enables a constant layer height across all layers of the component. Preferably, the layer height is between 0.2 mm and 8 mm. More preferably, the layer height of the individual layers of the component is in the range of 0.5 mm to 4 mm.

The extruder of the material application unit can be configured to process granulate and/or to process filament. In the context of the invention, "filament" refers to a thread-like thermoplastic material that is produced in an upstream production stage and can thus be supplied to additive manufacturing as a spool-wound semi-finished product. Filaments advantageously offer a simple method of processing, handling and storage. However, it is preferred that granulate is processed in the extruder, as a larger selection of materials is available when processing granulate and granulate is cheaper to procure as a starting material. In addition, when using granulate, there is no dependence on the pre-produced semi-finished product, for example on the diameter of the filamentary material, so that higher production speeds and/or larger components are possible by relatively simple adjustment of the nozzle outlet and/or the volume flow. It is also possible to feed granulate continuously to the extruder, which eliminates the need for set-up processes such as changing a filament roll. To process granulate, the extruder can have an extruder screw disposed above the nozzle. The extruder screw is preferably positioned at an angle to the axis of rotation of the rotary head in order to improve the feed behavior of the extruder screw and to enable a measuring of the operating pressure of the extruder screw. When the extruder screw is positioned at an angle, sufficient space can be provided at the outlet of the extruder screw, i.e., at the transition to the nozzle of the material application unit, in order to arrange a pressure sensor in this space. More preferably, a dosing device for dosing granulate, which is moved together with the material application unit, can be disposed above the extruder screw. This offers the advantage that dosing takes place directly at the extruder screw and thus losses or malfunctions due to long routing when conveying granulate can be avoided or at least the dosing to the extruder screw is not impaired. Preferably, the dosing device feeds material continuously.

The device for additively manufacturing an, in particular rotationally symmetric, component can comprise a print table, on which a printing plate can be disposed or which forms the printing plate itself, in particular via the surface of the print table facing the build volume. Advantageously, the print table is heatable and/or has a vacuum unit for fixing the printing plate on the print table. If the printing plate can be arranged on the print table, it has proven to be advantageous that a vacuum unit for fixing the printing plate on the print table is comprised. Alternatively or additionally, it can be intended that the print table is heatable, whereby the printing plate can also be heated in order to increase the adhesion of the component to be additively built up, in particular of its first layer, to the printing plate. More preferably, the print table can have a plurality of independently heatable zones, so that, in particular with regard to the energy efficiency of the system, advantageously only the area of the print table in which a component is being built up needs to be heated. This means that unused areas of the printing plate can remain unheated. Depending on the requirements, it is also conceivable that the heatable zones of the print table can be heated to different degrees, i.e., that the zones have different temperatures. It has proven to be particularly advantageous if the print table has nine heatable zones of the same size. It is also conceivable that the printing plate is designed as a sacrificial plate. It is known to those skilled in the art that a sacrificial plate is disposed between the workpiece and the machine base, in this case between the component to be additively built up and the print table. The sacrificial plate is exposed to wear and therefore becomes unusable after several processing steps, in this case after the additive manufacturing of several components, and is therefore replaced after reaching a wear limit. The printing plate can also have a toothed surface for better adhesion of the first layer of the component to be additively manufactured.

The print table can have a compensation unit for compensating thermally induced changes in dimension, the compensation unit having at least one fixed bearing and one floating bearing. Due to the fact that the print table is fixed, preferably suspended, by means of a fixed bearing and a floating bearing, it has a relatively small clearance, which is, however, sufficient to compensate for thermal influences. The suspensions, namely the at least one fixed bearing and the at least one floating bearing of the compensation unit, are preferably disposed in a common plane, more preferably in an x-y plane. This preferably compensates for the expansion of the print table due to thermal influences in the y-direction. It is conceivable that a dimensional change of the print table of up to 2 mm, 3 mm, 4 mm or 5 mm can be compensated due to the advantageous suspension via fixed bearing(s) and floating bearing(s).

To protect the build volume of the device against external influences, in particular air draft and temperature fluctuations, the device can have a manufacturing chamber which is sealed against the environment. The manufacturing chamber is preferably limited by the print table and a housing. In other words, the build volume is enclosed by the housing and limited at the bottom by the print table. With such a closed manufacturing chamber, the temperature can be kept constant within the manufacturing chamber during the entire additive manufacturing process of a component, which improves the quality and the bonding of the individual layers and the material strands to each other. It is also conceivable that the manufacturing chamber is heated with an additional heating device and/or has a ventilation device for active ventilation in order to be able to regulate the temperature in the manufacturing chamber as required, preferably by means of the control device. It is also conceivable that an additively manufactured component is tempered in the manufacturing chamber after and/or during the manufacturing process. By tempering, whereby a component is exposed to heat treatment over a longer period of time, stress in the component can advantageously be reduced. Preferably, the manufacturing chamber has a height of at least 1400 mm, 1500 mm, 1600 mm or 1700 mm. More preferably, the manufacturing chamber has a rectangular base area predetermined by the printing plate, the sides of which have a length of at least 1000 mm, 1100 mm, 1200 mm, 1300 mm, 1400 mm, 1500 mm, 1600 mm or 1700 mm. Most preferably, the printing plate and thus the base of the manufacturing chamber is square with a side length of 1500 mm.

It has proven to be advantageous if the control device is configured to control the rotating speed of the rotation of the rotary head around the nozzle in accordance with the movement speed of the material application unit in such a manner that the rotary head performs a full rotation around the nozzle while the material application unit traces a full winding around the component rotation axis or component longitudinal axis. This ensures that both the compressor and the heating device are optimally aligned with the nozzle, the deposited material strand and the material application area at all times during the additive manufacturing of components, and in particular for rotationally symmetric or circular cylindrical components. It is known that the component longitudinal axis refers to the axis of a body or component corresponding to the direction of its greatest extension, whereby the longitudinal axis may coincide with the axis of symmetry or axis of rotation of the component, depending on the embodiment of the component. In the context of the invention, the component longitudinal axis preferably extends in the z-direction. Furthermore, it has been discovered that the material application unit is advantageously moved within a layer in windings, preferably circular windings, i.e., in the manner of a planar spiral, during material application, so that no tearing off of the material strand or separation of the material strand within a layer of the component is required. This in turn can increase the stability within the layer of a component. The control device is preferably configured to control the rotating speed of the rotary head around the nozzle not only as a function of the movement speed of the material application unit, but also as a function of the path length of a complete turn around the component rotation axis or component longitudinal axis to be traveled by the material application unit. Since the movement speed is adjustable and the path length of a turn around the component rotation axis or component longitudinal axis depends on the component to be manufactured and is therefore also known, the control device can use this already known data in a simple manner and use it to control the rotating speed of the rotation of the rotary head around the nozzle without the need for further measurement or data acquisition.

Furthermore, the object described above is attained by a method for additively manufacturing an, in particular rotationally symmetric or circular cylindrical, component, at least one material strand for manufacturing the component being applied in layers by means of a material application unit. The method is characterized in that a material application area is heated by means of a heating device and an applied material strand is compressed by means of a compressor disposed on a rotary head and is materially connected to at least one more material strand, the compressor being moved along the deposited material strand when subjected to pressure, and the the rotary head being rotated around a nozzle of the material application unit during the movement of the material application unit.

The particular achievement of the method according to the invention is therefore that, as already indicated above, a material strand is applied to a previously heated material application area and is then compressed by the compressor, on the one hand, and materially bonded to at least one more material strand, preferably to the material strands adjacent in the x-y plane and in the z direction, on the other hand. It has proven to be advantageous that the compressor is moved along the deposited material strand under pressure and the rotary head is rotated around a nozzle of the material application unit during the movement of the material application unit. In other words, the material application unit for additive manufacturing of the component travels along at least one path curve within a layer, depending on the component geometry, and applies at least one material strand to a printing plate during this process. At the same time, the rotary head, which is on the material application unit and thus moves along with the material application unit, rotates around the nozzle of the material application unit in such a way that a controllable joining pressure can be applied by means of the compressor and thus the material strand just deposited can be compressed and the section of the path curve to be approached next, the material application area, can be heated by means of a heating device. By heating the material application area and compressing it with the compressor, a particularly stable, pressure-resistant component can be produced due to the material bonding of the material strands within a layer and between the layers.

In principle, in order to avoid unnecessary repetition with regard to the features, properties and advantages of the method according to the invention, reference should be made to the above disclosure of the device. This means that, in principle, features disclosed and described with respect to the device are to be regarded as described and claimable with respect to the method and vice versa.

Regarding a consistent material strand within a layer and thus regarding an increased component stability, it has proven to be advantageous that the material strand is applied in windings, preferably in the manner of a flat spiral, by means of a the material application unit within one layer. Preferably, the device and the method are designed in such a way that a layer is built up within the x-y plane and the component to be produced is produced from several layers that are deposited on top of each other in the z-direction. By moving the material application unit in windings, preferably spirally, tearing of the material strand within one layer can advantageously be prevented and thus the stability of the component can be increased.

According to a preferred embodiment of the method, it can be intended that the rotary head is rotated fully around the nozzle once while the material application unit is moved along a full winding around a component rotation axis or a component longitudinal axis. This ensures optimum alignment of the compressor and the heating device in relation to the nozzle, the material application area and the material strand already deposited.

It has proven to be advantageous if the material strand is compressed to a width of 4 mm to 30 mm by means of the compressor. Since the pressure is applied by the compressor in the z-direction, the width of the compressed material strand must be measured in an x-y plane. Preferably, the material strand is compressed to a width of 6 mm, 8 mm, 10 mm, 12 mm, 14 mm, 16 mm, 18 mm, 20 mm or 22 mm by means of the compressor.

The width of the compressed material strand can be controlled by the amount of material fed to the nozzle of the material application unit by means of an extruder and/or by the pressure applied by means of the compressor. It is known to the person skilled in the art that the amount of material fed is the amount of material per unit of time that is provided to the nozzle for depositing a material strand. It is therefore evident that the more material is supplied to the nozzle of the material application unit, the greater the volume of material strand applied. It has also been discovered that the larger the volume of material strand applied, the wider the compressed material strand. It would be conceivable to set the volume of material strand to be applied based on the nozzle diameter, but it has proven advantageous to control the amount of material fed to the nozzle based on the conveying capacity of a screw drive of the extruder. This allows regulation in a simple manner, whereby set-up processes can be avoided, for example by replacing a nozzle.

An unreinforced semicrystalline material can be used as a material for manufacturing the component. Preferably, polyethylene (PE), polypropylene (PP), polyvinylidene fluoride (PVDF), polyamide (PA) or polyoxymethylene (POM), can be used. More preferably, polyethylene, polypropylene or polyvinylidene fluoride is used. In order to process the widest possible range of materials, the materials in the material application unit can be heated up to 350 °C and thus materials with a corresponding melting temperature can also be processed. Polyethylene is preferably processed at a temperature of 300 °C to 340 °C, more preferably at 310 °C to 330 °C. Polypropylene is preferably processed at a temperature of 190 °C to 230 °C more preferably at a temperature of 200 °C to 220 °C. Polyvinylidene fluoride is preferably processed at a temperature of 210 °C to 280 °C, more preferably at a temperature of 230 °C to 260 °C.

The invention further proposes an, in particular rotationally symmetric, component, manufactured using the method according to the invention and which is formed in the manner of a hollow cylindrical tube or tube section. Such components can be manufactured in a particularly robust and simple manner using the method according to the invention. Due to the interconnection of the material strands within a layer and the interconnection of the individual layers of the component, the hollow cylindrical tubes or tube sections produced by the method according to the invention are suitable for conducting fluids.

Advantageously, the, in particular rotationally symmetric, component is resistant to compressive stress up to at least 16 bar. This relatively high compressive strength of the component, caused by the materially bonded connection within the individual layers and between the several layers of the component, allows the component to be used in demanding applications. For example, the component can be used to conduct pressurized fluids and/or in demanding environments, such as underground.

The wall thickness of the component can amount to between 5 mm and 400 mm and the component can have an outer diameter between 90 mm and 1400 mm, the component having a height of up to 1500 mm. This means that relatively small hollow cylindrical tubes or tube sections can be produced as well as tubes or tube sections with relatively large dimensions. Due to the layered and tool-free structure of the component, the dimensions of the component and the wall thicknesses of the component can be determined independently of tools, for example forming tools.

It is assumed that the definitions and/or explanations of the terms described above apply to all aspects described in the description, unless otherwise stated.

Further details, features and advantages of the invention can be derived from the following description of preferred embodiments in conjunction with the dependent claims. The respective features may be realized individually or in combination with one another. The invention is not limited to the embodiments. The embodiments are shown schematically in the figures. Identical reference numbers in the individual figures refer to identical or functionally identical elements or elements that correspond to each other in terms of their function. The following embodiments serve only to illustrate the invention. They are not intended to limit the subject matter of the patent claims in any way.

Figure 1:
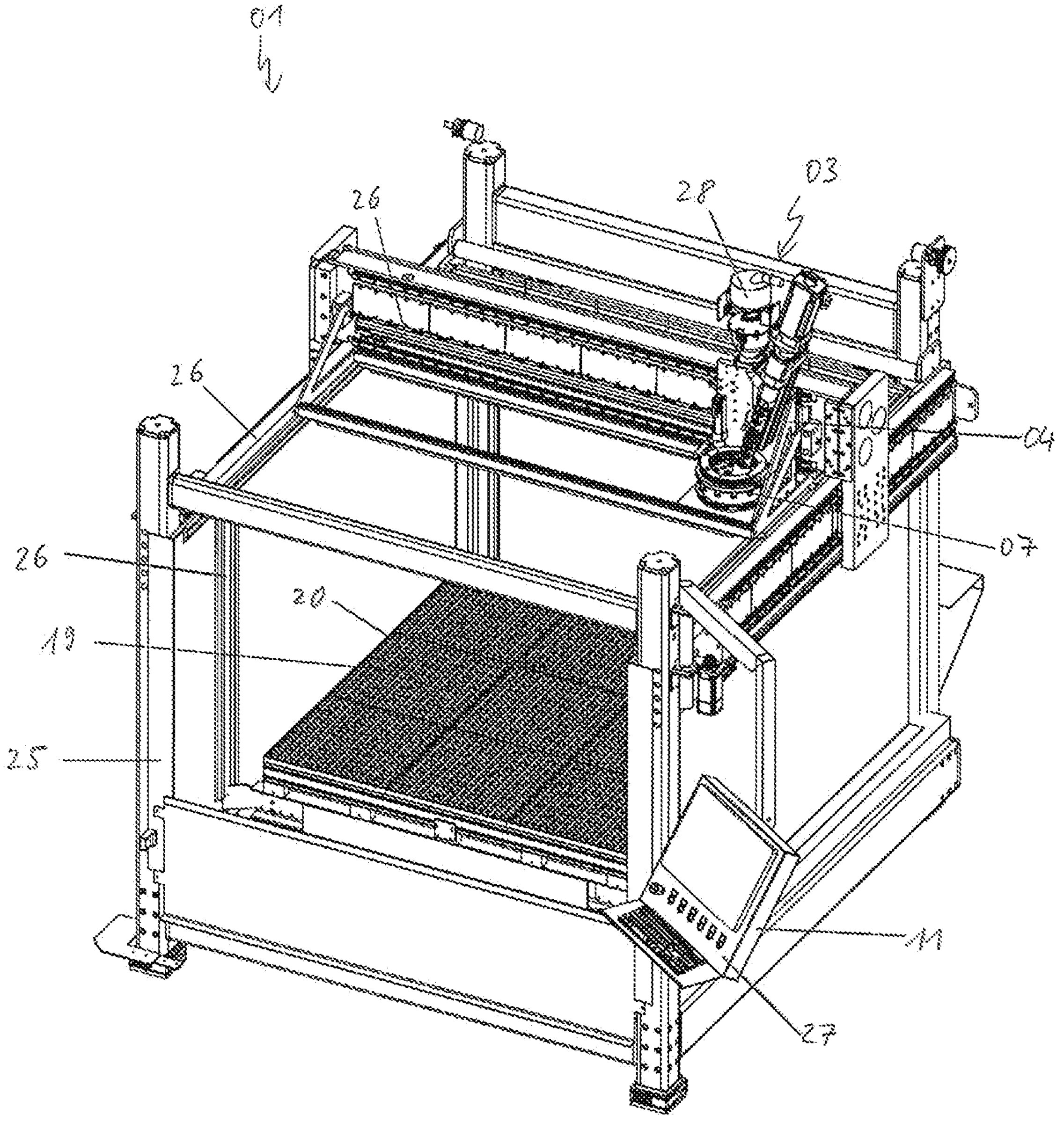
FIG. 1 shows a perspective view of a device according to the invention.
Figure 2:
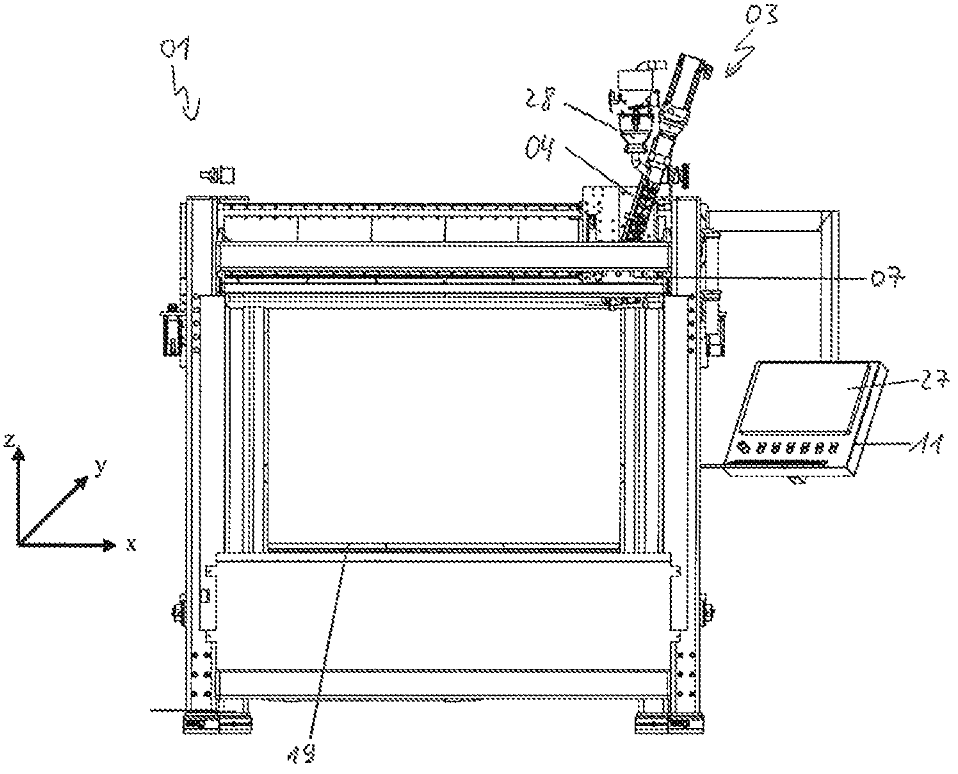
FIG. 2 shows a front view of the device according to the invention from FIG. 1.
Figure 3:
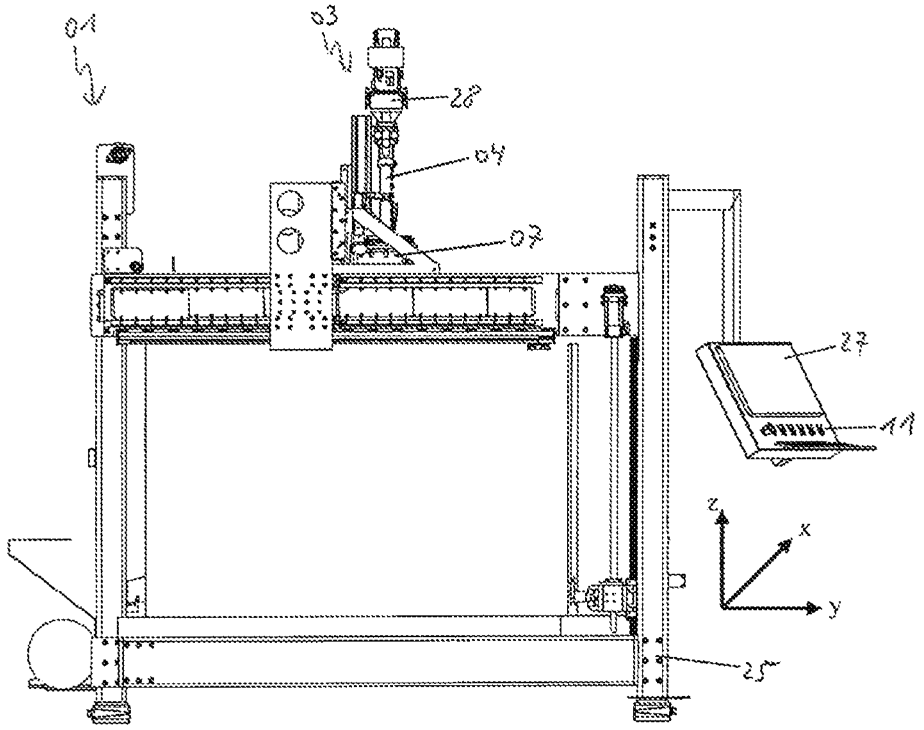
FIG. 3 shows a side view of the device according to the invention from FIG. 1.
Figure 4:
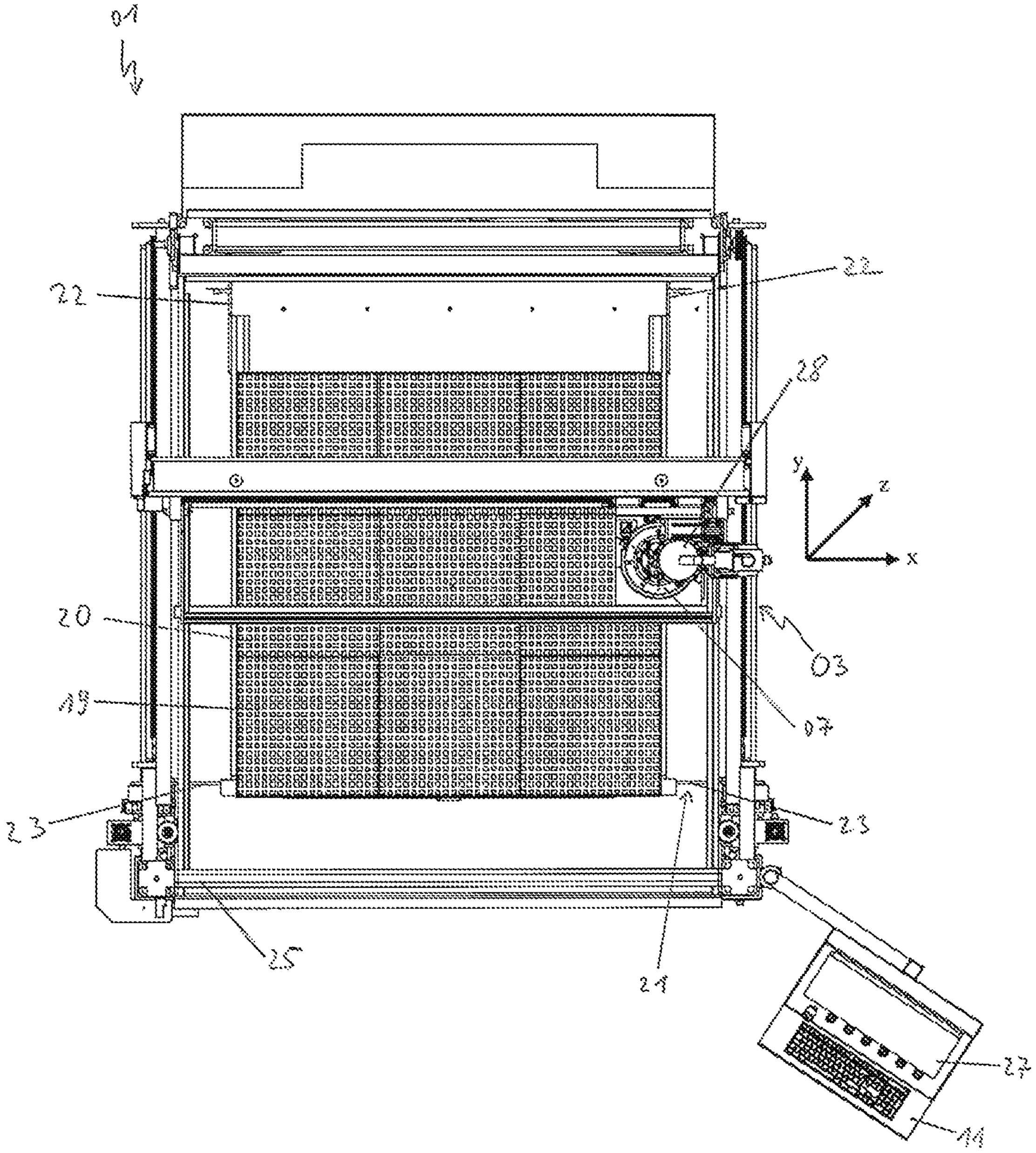
FIG. 4 shows a top view of the device according to the invention from FIG. 1.

FIGS. 1 to 4 show an embodiment of the device according to the invention for additively manufacturing an, in particular rotationally symmetric, component in different views. The structure of the device and the basic idea of the invention can be seen from the combined view of FIGS. 1 to 4. The device has a frame 25 in which linear guides 26 for moving print table 19 and material application unit 03 are disposed. It can be seen that material application unit 03 is moveable in the x-y direction, while print table 19 can be raised and lowered in the z direction. A printing plate, not shown here, can be disposed on print table 19 and can be mounted on print table 19 by means of vacuum unit 20. Component 02, which is not shown in FIGS. 1 to 5, is then built up layer by layer on the printing plate, whereby component 02 is built up in the z-direction. It can also be seen from FIGS. 1 to 4 that material application unit 03 has a rotary head 07, an extruder 04 and a dosing device 28 for feeding granular material to extruder 04. The structure of material application unit 03 is described in more detail in FIGS. 5 to 8. It is conceivable that control device 11, as in the embodiment example shown, is integrated into a control panel or is disposed elsewhere on device 01 or is disposed at a distance from device 01. It is essential that a data connection between control device 11 and the components of device 01 to be controlled, in particular material application unit 03, can be established wirelessly and/or by cable.

Figure 5:
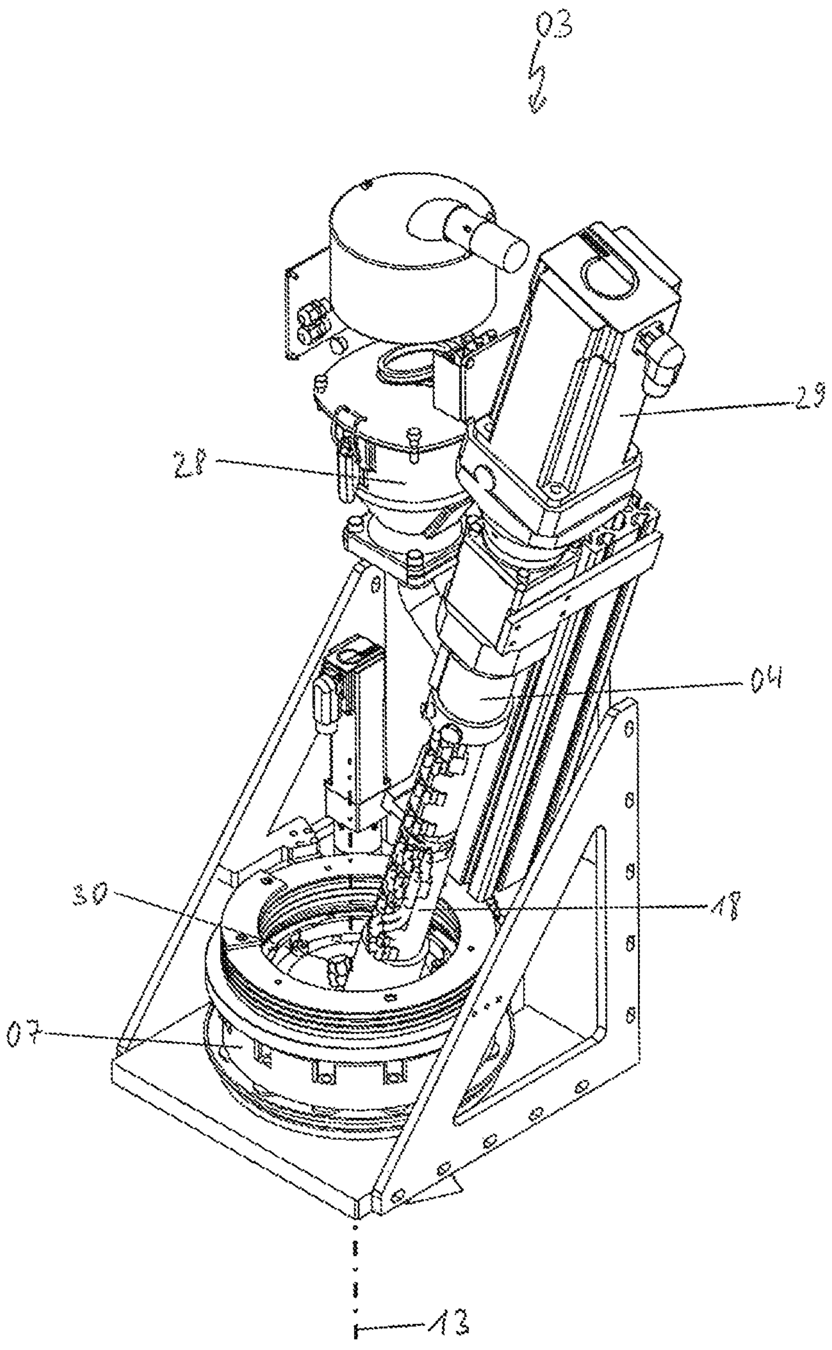
FIG. 5 shows a perspective view of the material application unit of a device according to the invention.
Figure 6:
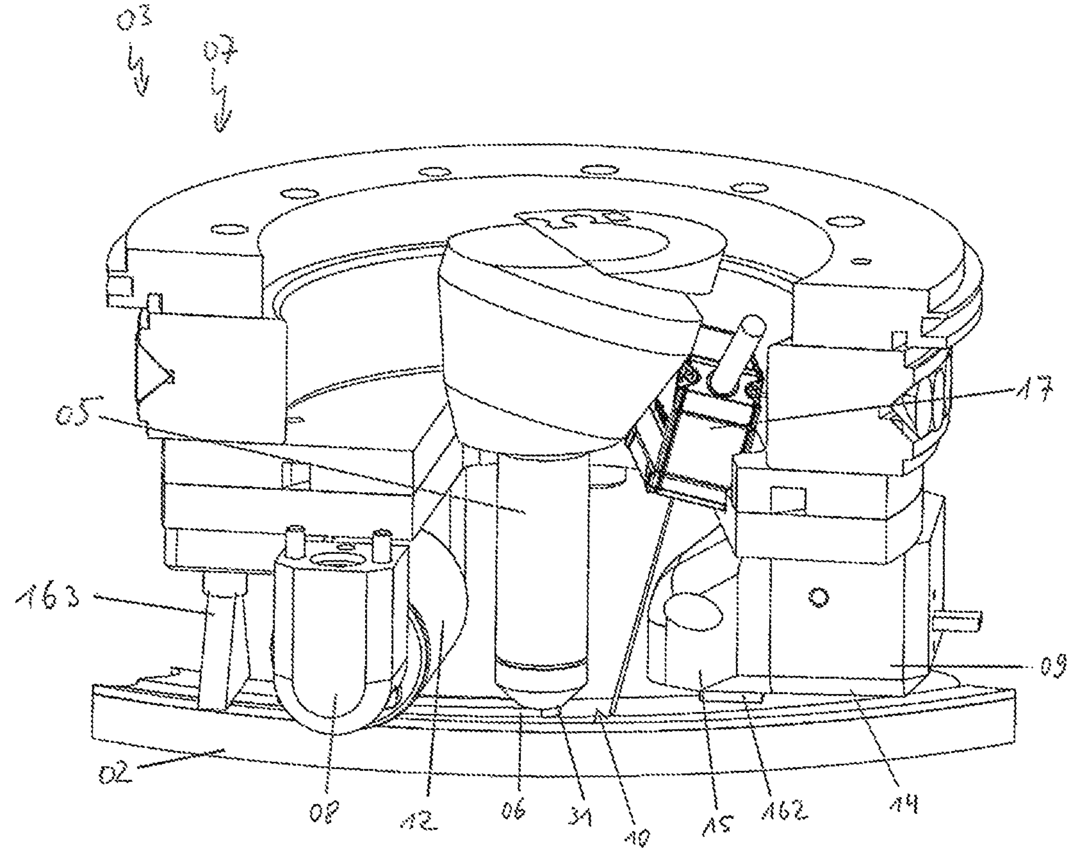
FIG. 6 shows a sectional view of a lower section of a material application unit according to the invention.
Figure 7:
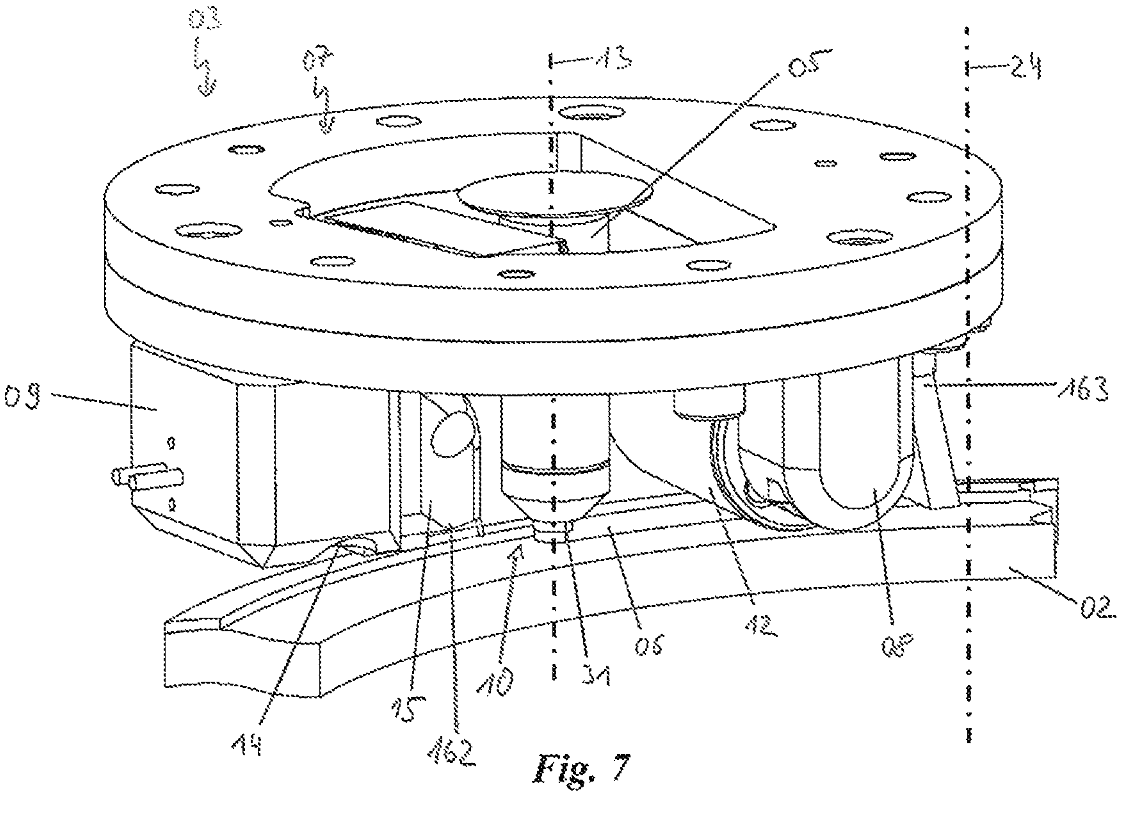
FIG. 7 shows a lower section of a material application unit according to the invention.

FIG. 5 shows a perspective view of material application unit 03. Rotary head 07 is rotatably disposed around a nozzle 05, which is not shown here and whose axis of symmetry coincides with axis of rotation 13 of rotary head 07, as can be seen in FIG. 7 below. It can be clearly seen in FIG. 5 that extruder 04 with extruder screw 18 and extruder drive 29 is inclined relative to axis of rotation 13 of rotary head 07, so that an optimum feed behavior of the granulate fed from dosing device 28 is possible, and the measurement of the operating pressure in extruder screw 18 can be carried out by means of operating pressure measuring to device 30. The structure of rotary head 07 of material application unit 03 can be seen in a combined view of FIGS. 6 and 7. Rotary head 07 is disposed on material application unit 03 so that it can rotate around axis of rotation 13, which coincides with the axis of symmetry of nozzle 05. A material strand 06 is dispensed from nozzle outlet 31 by means of nozzle 05 and thus component 02 is built up. The material application area, on which a new material strand 06 is subsequently deposited by nozzle 05, is heated by heating device 09 so that newly deposited material strand 06 can be materially bonded to the material strands already deposited in the layer currently being produced and to the layers of component 02 that have already been produced. Using the data from distance detecting element 17, which records the distance between distance detecting element 17 and the last completed layer and thus allows conclusions to be drawn about the distance between nozzle outlet 31 and the last completed layer, nozzle 05 can be positioned and/or the material volume flow can be controlled in such a way that each layer has the same height. Deposited material strand 06 is compressed by compressor roll 12, which can be rotated about a rotation axis disposed in an x-y plane, whereby the application of pressure by compressor roll 12 results not only in a connection with the already deposited material strands of the layer currently being produced, but also a connection with the most recently completed layer underneath. Temperature detecting element 15 can provide further data for control device 11 (not shown). It is intended that the temperature is detected without contact by means of infrared sensors 161, 162, 163, whereby temperature sensor 163 is not shown here due to the limited section of material application unit 03, but can be seen in FIG. 8. It can therefore be seen from the combined view of FIGS. 6 to 8 that the temperature of material application area 10 is detected by temperature sensor 161 before material application area 10 is heated by means of heating device 09 and is detected again by temperature sensor 162 after heating by heating device 09. This allows conclusions to be drawn about the thermal output of heating device 09, so that heating device 09 can be controlled based on the temperatures detected by temperature sensors 161 and 162. Additional infrared sensor 163 of temperature detecting element 15 is used to detect the temperature of deposited material strand 06 after it has been compressed. The data from additional infrared sensor 163 can be used, for example, to control the temperature of compressor roll 12. Due to the rotatable arrangement of the components of rotary head 07 according to the invention around axis of rotation 13, which coincides with the axis of symmetry of nozzle 05, it is possible to control the rotation of rotary head 07 around nozzle 05 in such a way that rotary head 07 is rotated once completely around nozzle 05, while material application unit 03 together with rotary head 07 travels a complete turn around component rotation axis 24 or describes a circular path. Due to the described rotation of rotary head 07 and the corresponding arrangement of the components of rotary head 07 in relation to nozzle 05, the compressor, distance detecting element 17, temperature detecting element 15 and heating device 09 are optimally aligned at all times.

Figure 8:
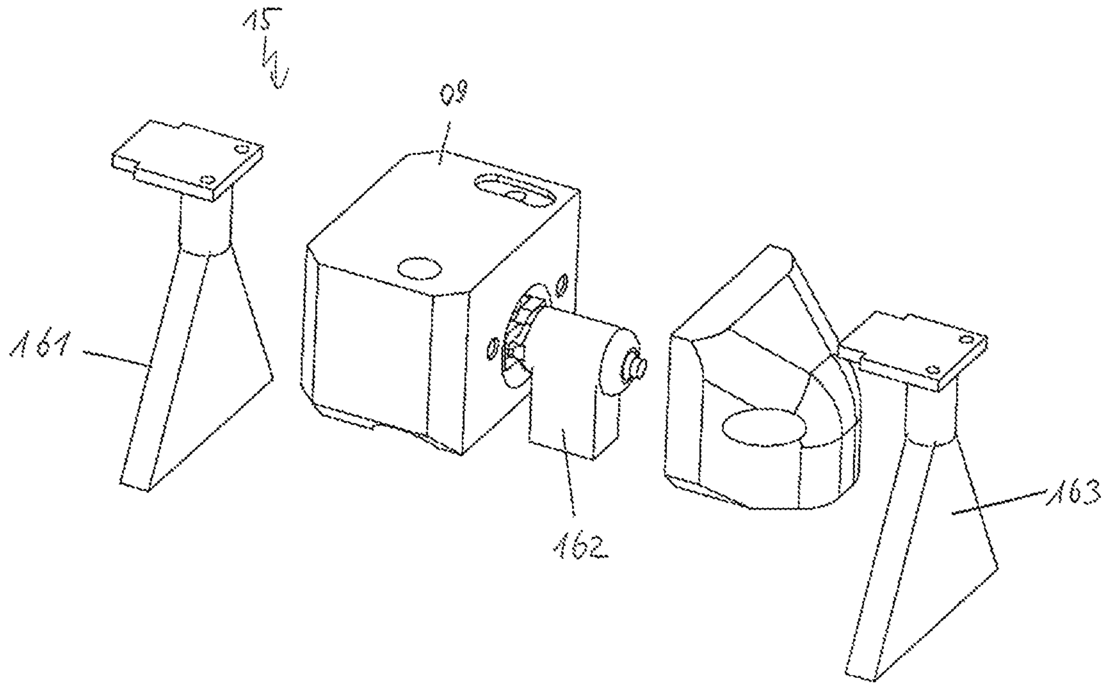
FIG. 8 shows an exploded view of a heating device and temperature detecting element of a device according to the invention.

FIG. 8 shows an exploded view of heating device 09 and the components of temperature detecting element 15. In this illustration, the three infrared sensors 161, 162, 163 of temperature detecting element 15 can be seen. It can also be seen that a temperature sensor is disposed on heating device 09 in order to save build volume and to be able to measure the temperature as close as possible to heating device 09.

The invention claimed is:

1. A device for additively manufacturing a component, said device having a material application unit which is movable along at least two axes and which has an extruder and a nozzle for applying a material strand, the device comprising:

a rotary head having a compressor for compressing a material strand and having a heating device for heating at least one material application area, the rotary head being disposed on the material application unit and being rotatable around the nozzle, and a control device which is configured to control at least the rotary head and the compressor and the heating device; and a distance detecting element for determining the distance between at least one material strand that has already been applied and a nozzle outlet;

wherein the rotary head is in a shape of an annulus and the rotary head surrounds the nozzle with the nozzle being centrally received through the annulus of the rotary head and with the nozzle being separated from the rotary head and the rotary head surrounds the distance detecting element, with the distance detecting element also being located within the annulus of the rotary head;

wherein both the compressor and the heating device are swivelable relative to the nozzle by means of the rotary head; and wherein the rotary head is rotatable during material application in order to align both the compressor and the heating device relative to the nozzle depending on a path curve to be followed by the material application unit.

2. The device according to claim 1, wherein the compressor has a compressor roll which is rotatably mounted around a rotation axis.

3. The device according to claim 1, wherein the compressor is coolable and/or heatable.

4. The device according to claim 1, wherein the heating device has a heating module for a contactless heating process.

5. The device according to claim 1, further comprising a temperature detecting element for detecting at least the temperature of a deposited material strand.

6. The device according to claim 1, wherein the extruder is configured to process granulate and/or filament.

7. The device according to claim 1, further comprising a print table on which a printing plate can be disposed or which forms the printing plate, the print table being heatable and/or having a vacuum unit for fixing the printing plate on the print table.

8. The device according to claim 7, wherein the print table has a compensation unit for compensating thermally induced changes in dimension, the compensation unit having at least one fixed bearing and one floating bearing.

9. The device according to claim 1, further comprising a manufacturing chamber which is sealed against the environment.

10. The device according to claim 1, wherein the control device is configured to control the rotating speed of the rotation of the rotary head around the nozzle in accordance with the movement speed of the material application unit in such a manner that the rotary head performs a full rotation around the nozzle while the material application unit traces a full winding around the component rotation axis.

* * * * *